United States Patent [19]

Borneman

[11] 3,721,110

[45] March 20, 1973

[54] UNIVERSAL JOINT BEARING CUP IMPROVEMENT

[76] Inventor: Glenn S. Borneman, 605 West Ridge Pike, Royers Ford, Pa. 19468

[22] Filed: May 6, 1971

[21] Appl. No.: 140,766

[52] U.S. Cl. ..................................................64/17 A
[51] Int. Cl. ..................................................F16d 3/41
[58] Field of Search ....................................64/17, 18

[56] References Cited

UNITED STATES PATENTS

| | | | |
|---|---|---|---|
| 3,481,159 | 12/1969 | Kayser | 64/17 A |
| 3,470,711 | 10/1969 | Kayser | 64/17 A |
| 3,492,710 | 2/1970 | Ditmer | 64/17 A |
| 2,802,351 | 8/1957 | Anderson | 64/17 A |

Primary Examiner—Edward G. Favors
Attorney—Walter E. Pavlick, Harold D. Shall and John F. Teigland

[57] ABSTRACT

A cardan type universal joint having cup-shaped bearing races for pivotally and drivingly connecting a pair of yoke members to a journal cross in torque transmitting relation wherein the bearing cups are provided with an improved thrust receiving surface in the form of a tapered annular raised rib which is integral with the inner face of the end wall. In another embodiment this feature is combined with a crowned surface on the cylindrical side wall of the bearing race which is designed to permit better distribution of load over the mean span of the trunnion portions of the journal cross.

6 Claims, 5 Drawing Figures

INVENTOR.
GLENN S. BORNEMAN
BY Walter E. Pavlick
ATTORNEY

INVENTOR.
GLENN S. BORNEMAN
BY Walter E. Pavlick
ATTORNEY

UNIVERSAL JOINT BEARING CUP IMPROVEMENT

BACKGROUND OF THE INVENTION

1. Field of Invention

This invention relates generally to universal joints comprising a pair of yokes pivotally mounted with respect to each other by means of bearing cups disposed about the trunnions of a journal cross. More particularly, this invention is directed to such a joint including improved thrust receiving means between the journal cross trunnion end and the bearing cup end wall.

2. Description of the Prior Art

A conventional universal joint which permits one shaft to drive another at an angle to it consists of a journal cross and two yokes, the two yokes are set at right angles to each other and their open ends are pivotally mounted with respect to the trunnions of the journal cross by means of needle bearings interposed between the yokes and the trunnions and retained by a bearing cup.

In this type of construction each yoke-member is allowed to pivot on its own axis on the trunnions of the journal cross while permitting transmission of rotary motion from one yoke member to the other.

For proper operation and long life in joints of this type, it is essential that the journal cross be accurately positioned with respect to the axis of rotation of the yoke-members so as to minimize unbalanced centrifugal forces which tend to cause undesirable vibration. To accomplish this feature, the ends of the trunnions are disposed in thrusting relationship with the inner wall of the bearing race and thereby serve to maintain the journal cross in a central position with respect to the yokes. While this arrangement has proved satisfactory it posses certain drawbacks in that in the past, excessive contact area has been present between the thrust engaging surfaces resulting in a structure which has a tendency to entrap dirt or other particles therebetween and cause a galling effect to take place. Further, this large contact area is detrimental when stresses applied to the trunnion tend to cock the same, this will result in a digging effect being placed on the thrust faces of the bearing race by the edges of the trunnion ends.

The friction wear and resulting heat build-up accompanying the above cited effects makes it most desirable to have as limited a contact as possible between the thrust surface on the bearing race, and the thrust face on the trunnion while still providing the necessary contact therebetween so as to properly position the cross with respect to the joint axis. Since the trunnion under these conditions acts as a cantilever beam tending to bend when torque is applied to the joint, it can be seen that not only the thrust surfaces but also the bending stresses of the trunnion are a continual source of difficulty in such assemblies.

It will be evident that in structures of this type loose tolerances as well as flexure of the bearings and yokes during operation due to centrifugal forces and high loads result in misalignment and eventually failure of the joint. It can be seen from this that one of the most important requirements in a universal joint of this type is to provide sufficient bearing life and this is difficult since one of the major functions of the bearing is to accurately position the journal cross with respect to the axis of rotation of the joint.

Prior art devices are known which have attempted to remedy the problems caused by undesirable engagement resulting between the mating thrust faces of the trunnion and bearing race. The known devices accomplish this by providing a separate means between the thrust surfaces. One such arrangement for accomplishing this is disclosed in U. S. Pat. No. 1,943,415, which provides a thrust element in the form of a ball. Other arrangements are shown in U. S. Pat. No. 2,141,264 in which a flat shim is provided, in U.S. Pat. No. 3,074,255 wherein an annular flat nylon thrust bearing is used and in U. S. Pat. No. 3,200,615 providing a roller type thrust bearing. A disadvantage in each of the above instances is the requirement of an additional element. Also known are bearing structures having means constructed integral with the thrust face of the race adapted to receive axial loads from a trunnion. Devices of this type are shown in U. S. Pat. Nos. 2,727,370 and 3,178,907. Such arrangements, however, still possess drawbacks which make them costly and impractical. In the former (FIG. 3) the trunnion must be altered to receive the tapered end of a pin which is made integral with the race whereas in the latter (FIG. 4) the end wall of the race is deformed convexly relative to the thrust face of the trunnion so that it can function in a resilient manner but requires costly precision in manufacturing the same.

SUMMARY OF INVENTION

An ideal condition to have when area 47 to control or minimize friction torque between two thrust surfaces which are capable of relative rotational movement is to have a point contact, however, in universal joints of this type this is an impossibility due to the fact that machining pilots and lube passages are present in the outer ends of the trunnions. Furthermore, upon wear, point contact ceases to exist since a certain amount of wear occurs between the two surfaces as the joint is put into operation and relative movement takes place. This is referred to in the art as "break-in," with the final result being a wearing away of the point and a flat contact area being present. The next best method of accomplishing these objectives is to establish a minimum radius, minimum width circular contact pattern without interfering with the required machining pilots and lube passages. The present invention is intended to remedy these problems and, as a result of laboratory and field tests, well documented data is available to substantiate the fact that the present design has operated exceptionally well by producing minimum contact between the thrust surfaces and has also significantly reduced galling in the thrust surface area.

With the above noted problems in mind, it is an object of the present invention to provide a bearing race for a universal joint having an improved thrust receiving surface which initially promotes "break-in" and subsequently provides minimum contact with the thrust face on the trunnion.

This invention also provides a bearing cup wherein the improved thrust receiving surface provides greater protection against surface galling.

Another object is to provide an improved thrust receiving means for such a joint which is an integral part of the bearing race.

A further object is to provide a thrust receiving face on the bearing race with a raised tapered rib portion for cooperating with a thrust face of the trunnion to promote initial "break-in" (point contact) and subsequently minimize frictional contact therebetween (minimum flat surface).

In another embodiment the improved thrust surface is combined with a crowned surface on the cylindrical side wall of the bearing race to provide a bearing race which will permit better contact between the trunnion and the bearing race.

These and other objects and advantages of this invention will become apparent from the following detailed description when taken in connection with the accompanying drawings and pointed out in the claims.

DESCRIPTION OF THE PREFERRED EMBODIMENTS

Figure 1:
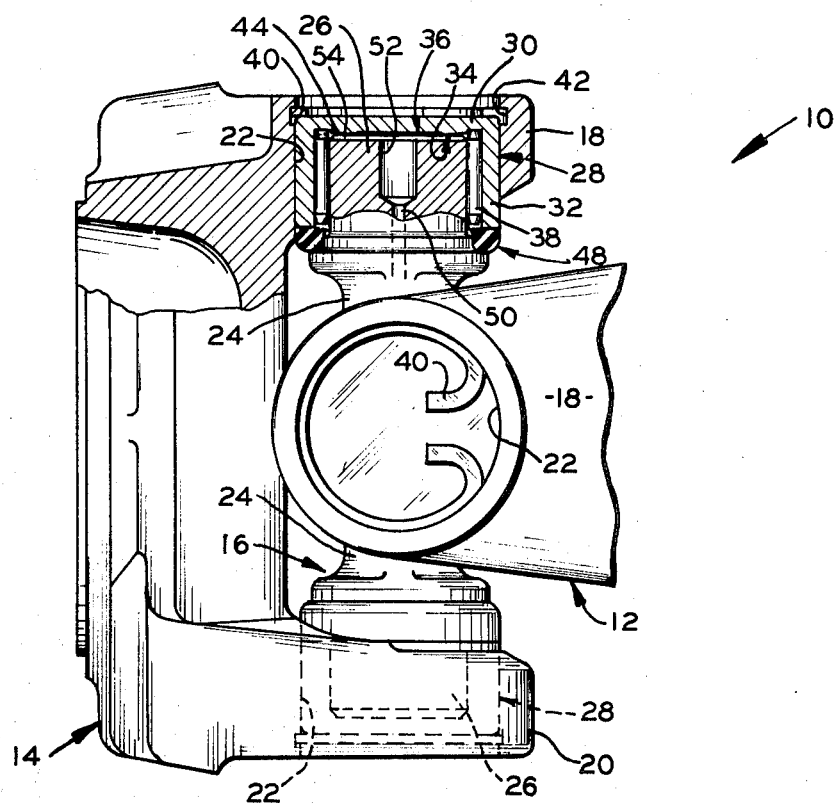
FIG. 1 is an elevational view of a universal joint partly in section incorporating the present invention.
Figure 2:
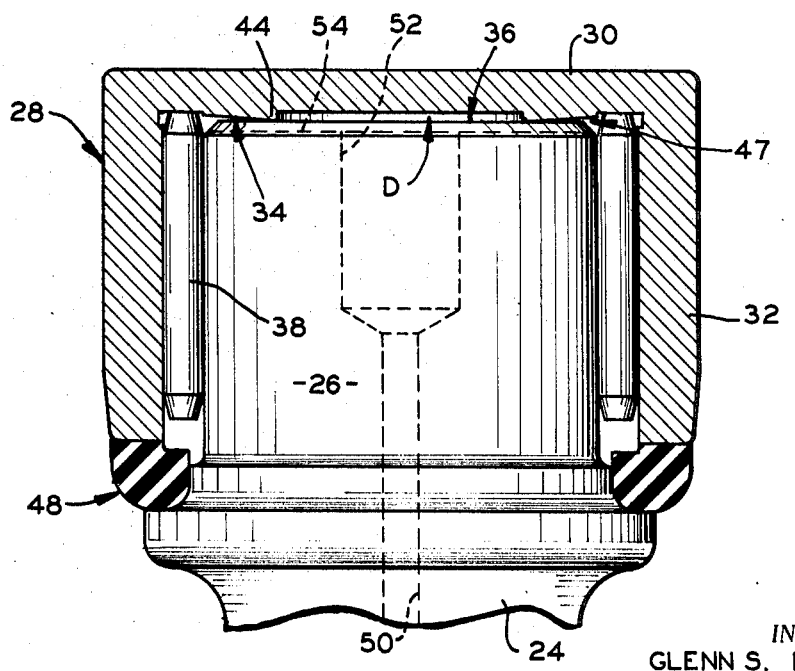
FIG. 2 is an enlarged sectional view of the yoke arm portion of one of the rotary members of the universal joint shown in FIG. 1.
Figure 3:
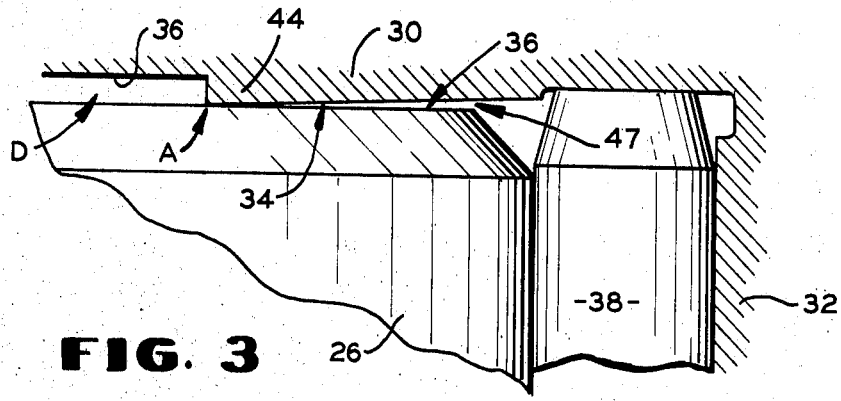
FIG. 3 is a further enlarged sectional view of a portion of the universal joint shown in FIG. 2 showing initial contact between the thrust surface.

Referring to the drawings and more particularly to FIGS. 1–4, a cardan type universal joint assembly is shown generally at 10 and includes a pair of yoke members 12 and 14 operatively connected in torque transmitting relation by means of a journal cross member 16. Each yoke member 12 and 14 has a pair of parallel spaced arms or lugs 18 and 20 provided with aligned apertures or cross holes 22. The journal cross 16 has a plurality of radially outwardly extending arms 24 formed with trunnion portions 26 at the outer ends thereof each adapted to project into the cross holes 22 in the yoke arms 18 and 20 and receive thereon a cup-shaped bearing race 28. The bearing race 28 has an end wall 30 and a cylindrical side wall 32 with an inner face 34 on the end wall 30 adapted to serve as a thrust face for engaging a cooperating thrust face 36 provided on the outer ends of the trunnion 26. The faces 34 and 36 are arranged to be in thrusting relation so that axial thrust loads imposed from the trunnion thrust face 36 of the trunnions 26 will be transmitted directly to the thrust face 34 on the bearing race. An annulus of needle bearings 38 is circumferentially disposed between the trunnions 26 and the interior surface of cylindrical side wall 32 of the bearing race 28 to provide substantially frictionless engagement therebetween. The bearing races 28 are held in place by means such as a snap ring 40 adapted to be located in an annular recess 42 provided in the cross holes 22 adjacent the outer end. The end wall 30, which closes the outer portion of the bearing race 28, is provided with means on the interior thrust face 34 thereof for effectively controlling firctional engagement and providing an improved bearing surface for receiving the axial thrust loads imposed thereon from the trunnion 26.

To this end the thrust receiving face 34 of the bearing race is provided with an annular concentrically arranged raised rib portion 44, which is formed as an integral part of the bearing race 28. The rib portion 44, in cross section, takes the form of a surface which tapers outwardly away from the thrust face 36 of the trunnion to provide a continuous annular gap 47 which tends to increase in distance between the tapered surface and trunnion face as it moves outwardly with respect to the thrust surface 36 of the trunnion 26. While the angle at which the taper is disposed may vary to some extent without materially affecting the desired result, it has been found that an angle of 4° works particularly satisfactorily.

Figure 4:
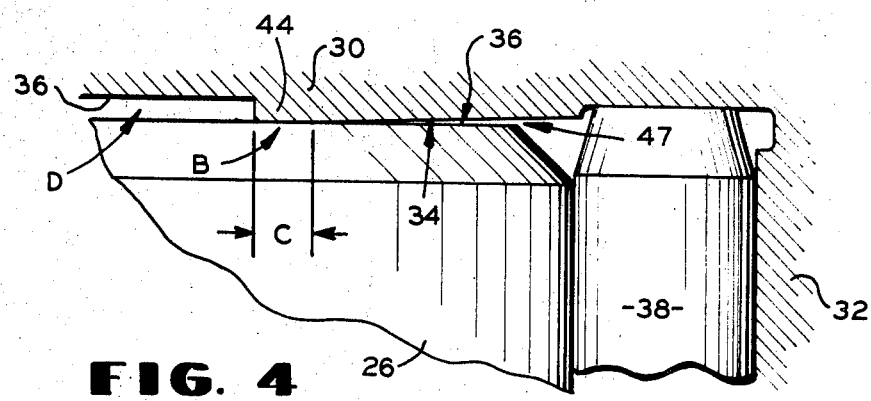
FIG. 4 is a view similar to FIG. 3 showing contact between thrust surfaces after the "break-in" period.

The rib 44 constitutes a circular bearing seat for cooperating with the flat thrust face 36 of the trunnion 26. When initially assembled the bearing races 28 are positioned around the trunnions 26 and pressed into the crossholes 22 by any well known process with the snap rings 40 inserted in the grooves 42 so as to bear against the end wall 30 of the bearing race 28 in such a manner as to subject the cooperating parts to a compressive action to produce sufficient distortion in one of the parts so that after "break-in," the parts are still maintained in the desired relationship. In the initial assembly the cooperating thrust surfaces assume a point contact relationship designated at A in FIG. 3. After completing the normal "break-in" period, the mating surfaces becomes slightly worn and assume a somewhat flat contact pattern such as shown in FIG. 4. Thus, after the wearing in stage has been completed, a condition exists which is still of an exceptional nature in that only a minimum flat contact surface, indicated by the area B wherein a width C is still present between the cooperating thrust faces. It will be readily apparent that by this arrangement the friction surface contact between the cooperating thrust faces has been controlled to an extent not previously accomplished in universal joints of this type. Also, by confining the contact area to such an extent, it is possible to significantly reduce galling since any particles entrapped in this small area can more readily be moved out from between the mating surfaces by the lubricant film and be passed either into the open area 47 provided between the tapered surface 46 and end face 36 or into lubricant grooves 54 extending across the thrust face 36 of the trunnion 26. Particles can also be forced into the area D located centrally of the rib 44.

Thus, by tapering or crowning the thrust pad portion of the bearing cup a means has been disclosed for effectively controlling friction and significantly reduces galling in the thrust pad area, i.e. confining the contact area to a minimum while providing sufficient contact to enable proper operation of the joint.

A sealing means shown generally at 48 engages the inner periphery of the side wall 32 of the bearing cup 28, adjacent the open end thereof and an adjoining portion of the trunnion 26 to provide a sealing arrangement to prevent egress of lubricant from within the bearing race and the ingress of contaminants into the bearing race.

For distributing lubricant to the needle bearing and other surfaces requiring lubricant, the journal cross 16 is provided with an inlet passage (not shown) extending from a grease fitting (not shown) at the center section of the journal cross. This inlet passage cooperates with radial passageways 50 provided in the four arms 24 of the journal cross 16. Each trunnion 26 has a central enlarged aperture 52 at the outer end thereof for connection to passageways 50 so that lubricant can be stored therein and during operation forced radially outward therefrom across transverse distributing grooves 54 cut across the thrust face 36 of the trunnion. The passageways 50, aperture 52 and groove 54 serving to permit the flow of lubricant to the needle bearings 38 and bearing surfaces of the bearing cup 28 and trunnion 26.

Prior to assembly the bearing race is charged with lubricant and during operation of the joint, this initial supply of lubricant is available for lubricating the surfaces by the passages 50 provided in the journal cross 16 and the grooves 54 in the outer faces 36 of the trunnion 26.

DETAILED DESCRIPTION OF THE SECOND EMBODIMENT

Figure 5:
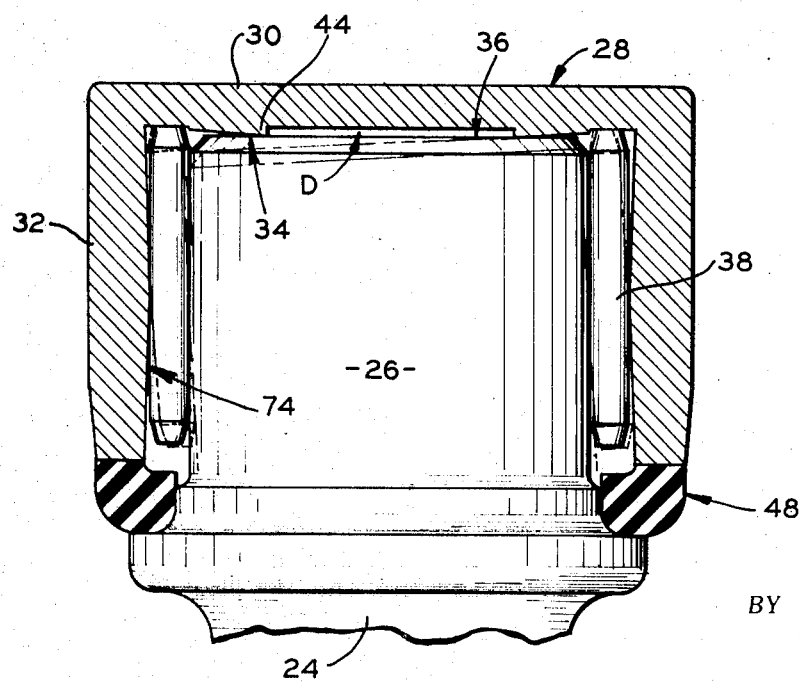
FIG. 5 is a view similar to FIG. 2 showing a second embodiment of the invention.

The embodiment disclosed in FIG. 5 is a further improvement of the bearing race 28 shown in FIG. 1 with additional means provided on the interior of the cylindrical side wall 32 to accommodate cocking resulting from stresses in the system. To this end the inner surface of the cylindrical side wall 32 is provided with a crowned surface 74, which in combination with the tapered thrust pad 34 serves to distribute the load more evenly over the mean span of the trunnion under application of excessive torque which tends to distort the trunnions.

The crowned surface 74 tapers inwardly toward the axis of the trunnion so as to provide equal flat circular surfaces which terminate at a point intermediate the height of cylindrical side wall 32. The smaller diameter thus being at this intermediate point.

It is apparent that the open area 47 formed as a result of the tapered thrust surface 34 will permit the trunnion 26 and needle bearings 38 to cock with respect to the bearing race 28 (shown in phantom in FIG. 5) so that contact is maintained with one of the flat surfaces provided by the crowned surface 74.

It will be appreciated that the crowned surface 74 and the tapered thrust pad area 34 can be machined in a single operation resulting in the cost of such an arrangement being held to a minimum. As the tool is fed into the cup to machine the crown on the side wall the operation is continued until the inner face of the end wall is contacted at which time the taper is formed thereon.

While several embodiments of the invention have been shown and described, it should be noted that the present invention is not limited to use on universal joints of the type utilizing the snap ring design for mounting the bearing race with respect to the yoke member but is also applicable to the various other types of bearing race mounts, i.e., the bearing cup, U-bolt or cap and bolt designs. Many changes and modifications can be made therein, and it is understood that this description is illustrative only and not for the purpose of rendering this invention limited to the details illustrated or described except insofar as they have been limited by the terms of the following claims.

What is claimed is:
1. In a universal joint assembly:
   a. a yoke member having an opening,
   b. a trunnion extending into said opening,
   c. bearing means disposed around said trunnion and in rolling engagement therewith,
   d. a bearing cup surrounding said bearing means and extending into said opening and having an end wall and a generally cylindrical side wall,
   e. means for retaining said bearing cup in said yoke opening, the improvement comprising:
   f. an annular tapered surface integral with said end wall of said bearing cup and engageable with said trunnion, said surface being tapered outwardly from its inner diameter, whereby upon initial assembly line contact exists between said annular tapered surface and said trunnion.

2. The combination of claim 1 wherein the universal joint is tightly assembled so that after initial break-in, area contact exists between the annular surface and the trunnion to control friction.

3. The combination of claim 2 wherein said area contact is an annulus of engagement of width less than the width of the annular surface.

4. The combination of claim 2 wherein said area contact is an annulus of engagement of a width less than one-half the width of the annular surface.

5. The combination of claim 1 wherein said taper is at an angle of approximately 4° with respect to said end wall.

6. The combination of claim 1 wherein said generally cylindrical side wall is crowned towards the middle thereof and said taper provides a gap between said trunnion and said annular surface to accommodate limited cocking between said bearing cup and said trunnion.

* * * * *